United States Patent Office 2,759,037
Patented Aug. 14, 1956

2,759,037
DRY CHARGED BATTERIES

Reginald H. Greenburg, Brooklyn, N. Y., and Joseph A. Orsino, Mountain Lakes, N. J., assignors to National Lead Company, New York, N. Y., a corporation of New Jersey No Drawing. Application March 31, 1953,
Serial No. 346,045

7 Claims. (Cl. 136—26)

This invention relates to lead-acid storage batteries, to dry charged negative plates for such batteries, and to a composition of matter to be employed in the manufacture of such plates.

In the manufacture of dry charged storage batteries, the principal problem is the preparation of the dry charged negative plates. The active material in the negative plates after electrical formation consists of finely divided metallic lead commonly referred to as sponge lead. The sponge lead is very reactive chemically and when it is exposed to air in a moist or wet condition it tends to oxidize very rapidly. To the extent of such oxidation the negative plates lose their electrical capacity and become unsuitable as a source of energy in a storage battery assembly until regenerated by a new charge.

Heretofore dry charged negative plates have been prepared with the aid of drying cabinets or chambers. The "formed" and washed plates were generally placed within the drying chamber in contact with an inert or non-oxidizing gas such as nitrogen, carbon dioxide or super-heated steam and dried at elevated temperatures. Such methods have not been entirely satisfactory because of the equipment and operating costs and because at times the plates would oxidize and overheat resulting in serious or destructive warping of the grid structures.

The principal object of the present invention is to provide an improved active material for storage batteries. Another object is to provide an improved method for the manufacture of dry charged negative plates. A still further object is to provide a simple and economical method for the production of dry charged storage batteries.

Broadly this invention contemplates an active material composition for lead-acid storage batteries comprising lead oxide and a small proportion of an organic oxidation inhibitor and also a process for the production of dry charged negative plates employing the active material of this invention wherein the electrochemically formed negative plates are dried in air.

More specifically, the active material composition comprises lead oxide and, intimately admixed therewith, about 0.2 to 2.5% by weight, based on said composition, of an organic oxidation inhibitor.

The organic oxidation inhibitors employed in this invention are the polycyclic aromatic oxidation inhibitors characterized by being substantially insoluble in storage battery formation electrolyte and unaffected by the electrochemical formation processes employed in forming and charging the battery plates. The term polycyclic aromatic oxidation inhibitors includes that well known class of inhibitors employed in the rubber art generally referred to as antioxidants. The oxidation inhibitors must be substantially insoluble in the battery electrolyte so that they will not be dissolved out of the active material during the formation and washing processes. They must also be unaffected by the electrochemical formation processes to the extent that they do not lose their character as oxidation inhibitors. This class of oxidation inhibitors includes hydroxy naphthoic acids, hydroxynaphthalenes, benzanthraquinones, dimethyl quinolines, naphthoic acids and homologous compounds. Hydroxy naphthoic acids are the preferred oxidation inhibitors.

The active material composition should contain between about 0.2 and 2.5% of the organic oxidation inhibitor based on the weight of the composition. An amount below 0.2% does not appreciably retard the oxidation of the charged negative plate. The oxidation inhibitor should not generally exceed 2.5% because if present in greater quantities an undesirable dilution of the active lead oxide constituents occurs and proper capacity and other battery characteristics are difficult to obtain. It is to be understood that a minor proportion of expander materials such as carbon, blanc fixe and organic lignin derivatives which are commonly employed in the art to increase the capacity and maintain the performance of the negative plates may be added to the composition of the present invention.

The manner of incorporating the organic oxidation inhibitor in the composition is not critical provided it is reasonably well dispersed in the mix. It may be added to the paste or the dry mix but for the purpose of obtaining better dispersion it will be found preferable to blend it into the dry lead oxide.

The lead oxide employed is generally litharge containing appreciable amounts of finely divided metallic lead. This lead oxide may consist entirely of litharge or of litharge containing other oxides of lead as will be understood by those skilled in the art.

In the practice of this invention, the active material composition is formulated into a paste and applied to grid structures according to conventional procedures. In preparing the paste, the vehicle employed will generally be dilute sulfuric acid or water. The vehicle will usually compose about 10 to 30% by weight of the paste composition. The unformed negative plates are assembled with positive plates and insulating separators into cell units and placed into tanks or battery containers with sulfuric acid electrolyte. The cells are then electrically charged according to customary procedures until the active material in the positive and negative plates is converted to lead peroxide and sponge lead respectively. At this point the cell units are disassembled and the negative plates washed to remove substantially all of the electrolyte. The formed and washed negative plates are then dried in a forced draft of air. This last step for the manufacture of dry charged negative plates, namely drying in a current of air, constitutes a wide departure from prior art processes wherein special drying cabinets and inert atmospheres were employed.

The dry charged negative plates made according to this process will remain in the reduced sponge lead state substantially unchanged i. e. fully charged whereas, heretofore, formed negative plates on exposure to air would oxidize rapidly with a corresponding loss of their capacity. The dry charged negative plates of the instant invention, upon reassembly with the other battery elements and without a booster charge, possess a capacity that compares very favorably to that of ordinary fully charged plates.

The following examples illustrate selected embodiments of this invention. In these examples finely divided uncalcined litharge was employed containing about 28% metallic lead. A proportion of basic lead sulfate or sulfuric acid was used in the negative active material to bulk the active material paste. The bulking agent was employed in sufficient quantity to give a cube weight or paste density of about 70, i. e. 70 grams per cubic inch of paste, to the test and control active material paste compositions.

The initial capacity of the dry charged negative plates without any intermediate or booster charge was determined by the S. A. E. 20-hour discharge test and a cold discharge test. The 20-hour test is the standard S. A. E. discharge test for storage batteries where the discharge rate employed is 1/20 of the ampere-hour rating at 80° F. until the battery is discharged to a predetermined rating. The capacity is measured in ampere-hours. An indication of the capacity retained is given in the examples based on the capacity of the same cells determined by a subsequent 20-hour test following a full recharge. The cold test was conducted at a discharge rate of 300 amperes at 0° F. and the capacity measured in minutes of discharge.

*Example I*

To 420 parts by weight of litharge containing 28% metallic lead as described above were added 3.2 parts of 1-hydroxy 2-naphthoic acid and 34 parts of basic lead sulfate. The active material was well mixed to disperse the dry constituents and then a paste prepared by adding 66 parts of water. This paste was applied to grid structures to make up negative plates. The plates were then assembled into cell units with positive plates and insulating separators, placed into cell containers filled with acid electrolyte and charged according to conventional procedures. The completely formed cell units were disassembled and the negative plate groups thoroughly washed with water. The negative groups were then well dried in a forced draft of air over a period of several hours.

Subsequently the dry charged negative plates were reassembled with insulating separators and the formed positive plates and placed into cell containers with sulfuric acid electrolyte of 1.275 specific gravity.

The initial capacity of these cells according to the SAE 20-hour test was 84.4 ampere-hours. This indicates that the dry charged negative plates retained 93% of their capacity.

A set of control cells prepared as in the above example but without hydroxy naphthoic acid gave a 20-hour capacity of 48.8 ampere-hours. This indicated a retention of 52% of their capacity.

*Example II*

Active material consisting of 390 parts by weight of litharge, 3.2 parts of 1-hydroxy 2-naphthoic acid, 64 parts of basic lead sulfate and 66 parts of water was prepared, pasted into grids, formed and dried exactly as in Example I.

After reassembling these dry charged negative groups and testing for cold capacity they gave an initial capacity of 3.09 minutes.

Control cells containing no hydroxy naphthoic acid gave an initial cold capacity of 0.42 minute.

*Example III*

Active material consisting of 397 parts by weight of litharge, 3.2 parts of 3-hydroxy 2-naphthoic acid, 57 parts of basic lead sulfate and 66 parts of water was prepared, pasted, formed and dried exactly as in Example I.

After reassembling these dry charged negative groups and testing for cold capacity they gave an initial capacity of 3.45 minutes.

Control cells containing no hydroxy naphthoic acid gave an initial cold capacity of 0.42 minute.

*Example IV*

To 450 parts by weight of litharge were added 3.2 parts of 1-hydroxy 2-naphthoic acid, 55 parts of water and 18 parts of 1.4 specific gravity sulfuric acid. This was worked into a paste, pressed into grid structures, then electrochemically formed and dried in a current of air as in Example I.

Subsequently the dry charged negatives were reassembled into cells and on 20-hour discharge test had an initial capacity of 89.5 ampere-hours. This indicates that the dry charged negative plates retained 92% of their capacity.

Control cells containing no hydroxy naphthoic acid had an initial capacity of 53.1 ampere-hours, indicating a retention of 55% of their capacity.

*Example V*

Active material consisting of 450 parts by weight of litharge, 3.2 parts of 1-hydroxy 2-naphthoic acid, 55 parts of water and 18 parts of 1.4 specific gravity sulfuric acid was prepared, pasted, formed and dried as above.

The dry charged negative groups were reassembled into cell units, placed in containers with acid electrolyte and discharged on cold test. The initial capacity of one set of cells was 2.69 minutes.

A set of control cells containing no hydroxy naphthoic acid had a cold test capacity of 0.70 minute.

The foregoing examples demonstrate the effectiveness of the active material of the instant invention in the production of dry charged batteries. Such batteries may be prepared with their initial capacities as sources of electrical energy substantially unimpaired. Furthermore, the manufacture of dry charged batteries according to this method results in substantial economies in equipment and operation costs inasmuch as special drying chambers requiring inert or non-oxidizing atmospheres are not necessary.

In a further modification of this invention, it is proposed to prepare active material concentrates containing relatively high proportions of organic oxidation inhibitors. The concentrate may contain the oxidation inhibitor in the order of about 50%. It is convenient and economical to prepare such concentrates. They are readily incorporated in additional lead oxide to prepare the desired active material composition. The employment of such concentrates contributes considerably to the production of a uniform and standard product. Further advantages of such concentrates are that they may be stored readily, shipped economically and may be marketed as a premium oxide concentrate.

The foregoing description and examples of our invention have been given for purposes of illustrating and no undue limitation should be deduced therefrom. It is obvious that variations within the skill of the art may be made without departing from the spirit of the invention.

We claim:

1. Active material composition for negative plates of lead-acid storage batteries comprising lead oxide and about 0.2 to 2.5% by weight based on said composition of a hydroxy naphthoic acid.

2. Active material composition according to claim 1 in which the hydroxy naphthoic acid is 1-hydroxy 2-naphthoic acid.

3. Active material composition according to claim 1 in which the hydroxy naphthoic acid is 3-hydroxy 2-naphthoic acid.

4. In a process for the manufacture of negative plates for dry charged storiage batteries, the steps in the manufacture of dry charged negative plates which comprise preparing an active material paste comprising lead oxide, hydroxy naphthoic acid and a vehicle, said hydroxy naphthoic acid being present in amount about 0.2 to 2.5% by weight based on said active material paste, applying said paste to the interstices of grid structures to make battery plates, electrochemically reducing said battery plates, washing the reduced and charged negative plates substantially free of electrolyte and drying in air.

5. In a process for the manufacture of negative plates for dry charged storage batteries, the steps in the manufacture of dry charged negative plates which comprise preparing an active material paste comprising lead oxide and about 0.2 to 2.5% by weight based on said active material of 1-hydroxy-2-naphthoic acid and a vehicle, applying said paste to the interstices of grid structures to make battery plates, electro-chemically reducing said battery plates, washing the reduced and charged negative plates substantially free of electrolyte and drying in air.

6. In a process for the manufacture of negative plates for dry charged storage batteries, the steps in the manufacture of dry charged negative plates which comprise preparing an active material paste comprising lead oxide and about 0.2 to 2.5% by weight based on said active material of 3-hydroxy-2-naphthoic acid and a vehicle, applying said paste to the interstices of grid structures to make battery plates, electro-chemically reducing said battery plates, washing the reduced and charged negative plates substantially free of electrolyte and drying in air.

7. A dry charged negative plate for storage batteries prepared by electrolytic reduction of an active material paste consisting predominantly of lead oxide and containing a hydroxy-naphthoic acid in the active material amounting to 0.2–2.5% by weight of said active material.

References Cited in the file of this patent

UNITED STATES PATENTS

| | | |
|---|---|---|
| 1,817,846 | Reinhardt | Aug. 4, 1931 |
| 2,018,563 | Martus | Oct. 22, 1935 |

FOREIGN PATENTS

| | | |
|---|---|---|
| 20,596 | Great Britain | Apr. 13, 1894 |

OTHER REFERENCES

Trans. Electrochemical Society, vol. 92, 1947, pages 233, 234 and 254–256.

Electro-Organic Chemistry, by Brockman, pp. 120, 280, 281, 312–314, 1926.